US010581604B2

(12) United States Patent
Mustafa et al.

(10) Patent No.: US 10,581,604 B2
(45) Date of Patent: Mar. 3, 2020

(54) POST-QUANTUM CRYPTOGRAPHIC COMMUNICATION PROTOCOL

(71) Applicant: COMSATS Institute of Information Technology, Islamabad (PK)

(72) Inventors: Iqra Mustafa, Islamabad (PK); Tanveer Khan, Islamabad (PK); Masoom Alam, Islamabad (PK); Nadeem Javaid, Islamabad (PK); Abid Khan, Islamabad (PK); Adnan Akhunzada, Islamabad (PK)

(73) Assignee: COMSATS Institute of Information Technology, Islamabad (PK)

( * ) Notice: Subject to any disclaimer, the term of this patent is extended or adjusted under 35 U.S.C. 154(b) by 220 days.

(21) Appl. No.: 15/871,853

(22) Filed: Jan. 15, 2018

(65) Prior Publication Data

US 2019/0116035 A1    Apr. 18, 2019

(30) Foreign Application Priority Data

Oct. 17, 2017 (PK) ..................... 538/2017

(51) Int. Cl.
*H04L 9/30* (2006.01)
*H04L 9/14* (2006.01)
(Continued)

(52) U.S. Cl.
CPC ............ *H04L 9/302* (2013.01); *H04L 9/0618* (2013.01); *H04L 9/0869* (2013.01); *H04L 9/14* (2013.01); *H04L 9/3093* (2013.01)

(58) Field of Classification Search
CPC ......... H04L 9/302; H04L 9/3093; H04L 9/14; H04L 9/0618; H04L 9/0869
See application file for complete search history.

(56) References Cited

U.S. PATENT DOCUMENTS

| 8,630,422 B2 * | 1/2014 | Gentry ................. H04L 9/0822 380/281 |
| 9,673,977 B1 * | 6/2017 | Kalach ................. H04L 9/0852 |

(Continued)

OTHER PUBLICATIONS

Melchor et al.; "Lattice-based homomorphic encryption of vector spaces", Jul. 2008, IEEE, pp. 1858-1862. (Year: 2008).*
(Continued)

*Primary Examiner* — Matthew Smithers
(74) *Attorney, Agent, or Firm* — H.C. Park & Associates, PLC

(57) ABSTRACT

A Post-Quantum Computing Cryptographic communication protocol including a lattice based RSA algorithm, the protocol may include: generating a public key and a private key pair; encrypting a message using a public key pair; transmitting the encrypted message over a communication channel; and decrypting the encrypted message using a private key pair, wherein the generating the public key and the private key pair includes; selecting a first random vector from lattices using a Klein's Algorithm; selecting a second random vector from lattices using the Klein's Algorithm; generating a shortest random vector using a Gauss Sieve algorithm; taking a first vector product of the first random vector and the second random vector; calculating a Totient function of the first vector product; converting the Totient function to the first vector product; generating the public key pair; and generating the private key pair.

19 Claims, 2 Drawing Sheets

(51) Int. Cl.
*H04L 9/06* (2006.01)
*H04L 9/08* (2006.01)

(56) References Cited

U.S. PATENT DOCUMENTS

| | | | |
|---|---|---|---|
| 9,716,590 B2* | 7/2017 | Gentry | H04L 9/008 |
| 10,097,351 B1* | 10/2018 | Kelly | H04L 9/3093 |
| 2014/0177828 A1* | 6/2014 | Loftus | H04L 9/008 |
| | | | 380/44 |
| 2016/0127125 A1* | 5/2016 | Yagisawa | H04L 9/0618 |
| | | | 380/28 |
| 2017/0155628 A1* | 6/2017 | Rohloff | H04L 9/30 |
| 2018/0183570 A1* | 6/2018 | Zheng | G09C 1/00 |

OTHER PUBLICATIONS

Lauter, Kristen: "Postquantum Opportunities: Lattices, Homomorphic Encryption, and Supersingular Isogeny Graphs", 2017, IEEE, pp. 22-27. (Year: 2017).*

Farik et al,; "The Need for Quantum-Resistant Cryptography in Classical Computers", 2016, IEEE, pp. 98-105. (Year: 2016).*

\* cited by examiner

POST-QUANTUM CRYPTOGRAPHIC COMMUNICATION PROTOCOL

CROSS-REFERENCE TO RELATED APPLICATION

This application claims priority from and the benefit of Pakistan Provisional Application No. 538/2017, filed on Oct. 17, 2017, which is hereby incorporated by reference for all purposes as if fully set forth herein.

BACKGROUND

Field

Exemplary embodiments relate to a Post-Quantum Computing Cryptographic communication protocol.

Discussion of the Background

Cryptographic techniques are widely deployed in a number of applications to make a secure communication over the Internet. The key concept in cryptography 'encryption' is a process where a message is encoded into text that is not understandable to an adversary. The encryption techniques may be categorized into two: symmetric encryption techniques and asymmetric encryption techniques. Symmetric encryption techniques use the same key for encryption and decryption, and may have two major challenges, 'key distribution' and 'key management'. An encryption technique also known as public key cryptography provides a solution to the above problems by introducing the concept of a public key and a private key. The most widely deployed asymmetric encryption technique that provides a communication security over a network is a Rivet-Shamir-Adleman (hereinafter, RSA) algorithm. The NP-hardness of the RSA algorithm lies in the integer factorization problem and it is considered the most secure algorithm against classical computers. A large amount of research has been done in this domain, in security systems using the RSA algorithm and methods thereof. Three variants of the RSA algorithm have been designed to speed up RSA decryption.

The conventional RSA algorithm is considered an NP hard problem on classical computers, but it is not quantum safe because it does not have the capability to adapt to a quantum computing attack by increasing the key-length to outpace the degree of growth of quantum computing. The quantum computers can break the NP-hardness of public key cryptographic techniques within polynomial time. Its fast performance and smart searching pose a security risk for data that has long been safely guarded by the certain math problems that are simply too complex for classical computers to solve. A classical computer uses bits of information such as 1's and 0's while quantum computer uses qubits, which can be either 0 or 1 or a superposition of both 0 and 1. This gives quantum computers an advantage over classical computers due to their improved parallel computation performance.

Moreover, quantum computers use quantum algorithms that can solve mathematical problems within polynomial time, which may pose a risk to the security of the classically encrypted information. Generally, the number of qubits increases in a linear fashion, with the key size of RSA algorithm. The key-length of the RSA algorithm may be increased in response to the development of the quantum computers, but a large scale quantum computer may be designed to overcome such effort. At the same time, merely increasing the key-length of RSA algorithm would increase the computation time for encoding and decoding the cipher by a factor of 8 (Moore's Law) on classical computers and is thus substantially impractical. Therefore, in order to make RSA algorithm quantum safe, its key-size needs to be doubled every two years. This would required larger bandwidth to transmit the cipher over a network.

It is generally considered that symmetric key ciphers are assumed to be quantum-safe while public key cryptosystems are not. To minimize the problem of key distribution and key management, which are the drawbacks of the symmetric cryptography, the asymmetric cryptosystem in application is preferred over symmetric cryptosystems. For this reason, there is a need for quantum safe cryptographic protocol to replace RSA algorithm, Elliptic Curve Cryptography (ECC) to stand against quantum computational problems which are believed to be secure against quantum algorithm attacks emerge from the fields of lattice theory, coding theory, and multivariate quadratic equations.

The ciphers based on these new theories do present some challenges as some of them present large key and signature sizes. There may be other conventional quantum safe cryptosystems. However, there is a need for a secure and efficient quantum cryptographic protocol which may promise unconditional security against quantum algorithms. The strength of these cryptosystem's will particularly affect the field of cryptography, showing some effective results such as eavesdropping detection and secure key distribution.

Cryptographic protocols are used for secure transmission of information over the internet. The currently deployed cryptographic primitives are symmetric and asymmetric. Symmetric primitives having much smaller key size then the message size makes security achievable in practice. However, the security of the conventional cryptographic scheme may be breached by the power of the Quantum Computing. So to improve the security of the symmetric primitives, we may use a key having a size as long as the message. The first practical implementation is one time password having key size as long as the message. The use of one time password may have the improved security. However, such application of using such long keys to improved the luminance may not be practical. The best alternative is public key cryptography having public and private keys. The public key cryptography primitives are widely deployed in most of the protocols like SSH, OpenPGP etc. as it achieves confidentiality as well as digital signature function. The harness of these security lies in integer factorization, logarithmic function etc. However, when quantum computers become reality the currently deployed cryptographic algorithms may be breached and become practically useless. The quantum computer using Shor's and Grover's algorithm can break these algorithms within polynomial time. So there is a need to have a protocol that show resistance to quantum computers.

The above information disclosed in this Background section is only for enhancement of understanding of the background of the inventive concept, and, therefore, it may contain information that does not form the prior art that is already known in this country to a person of ordinary skill in the art.

SUMMARY

Additional aspects will be set forth in the detailed description which follows, and, in part, will be apparent from the disclosure, or may be learned by practice of the inventive concept.

An exemplary embodiments of the inventive concept provides a Post-Quantum Computing Cryptographic communication protocol including a lattice based RSA algorithm, the protocol may include: generating a public key and a private key pair; encrypting a message using a public key pair; transmitting the encrypted message over a communication channel; and decrypting the encrypted message using a private key pair, wherein the generating the public key and the private key pair includes; selecting a first random vector from lattices using a Klein's Algorithm; selecting a second random vector from lattices using the Klein's Algorithm; generating a shortest random vector using a Gauss Sieve algorithm; taking a first vector product of the first random vector and the second random vector; calculating a Totient function of the first vector product; converting the Totient function to the first vector product; generating the public key pair; and generating the private key pair.

The encrypting the message using the public key pair may include: generating a second product vector by multiplying the message with an octonion, the octonion including a real linear combination of unit octonions; adding the second product vector with an isotropic vector selected from a vector space; and generating a cipher text by encrypting the message using the following formula: $C=a^e \mod n$. (C is the cipher text, a is addition of the second product vector and the isotropic vector, e is the public key used for encryption, and mod n is a modulo of the first vector product.)

Decrypting the encrypted message using a private key pair may include: decrypting the encrypted message using following formula: $a=C^d \mod V$, (d is the public key used for decryption and mod V is a modulo of the vector space.)

The lattices may be 8 dimensional lattices.

The first random vector, the second random vector, and the shortest random vector may be generated and passed to a Gauss Sieve algorithm.

The Totient function of the first vector product may be calculated by taking a norm of the first vector product.

The public key pair may be generated by Klein's Algorithm.

The encrypting the message using the public key pair may include transforming the message into a cipher text.

Decrypting the encrypted message using a private key pair may include transforming the cipher text into the message.

The protocol may be configured to be used in a quantum computing environment.

Additional features of the inventive concepts will be set forth in the description which follows, and in part will be apparent from the description, or may be learned by practice of the inventive concepts.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

DETAILED DESCRIPTION OF THE ILLUSTRATED EMBODIMENTS

Figure 1:
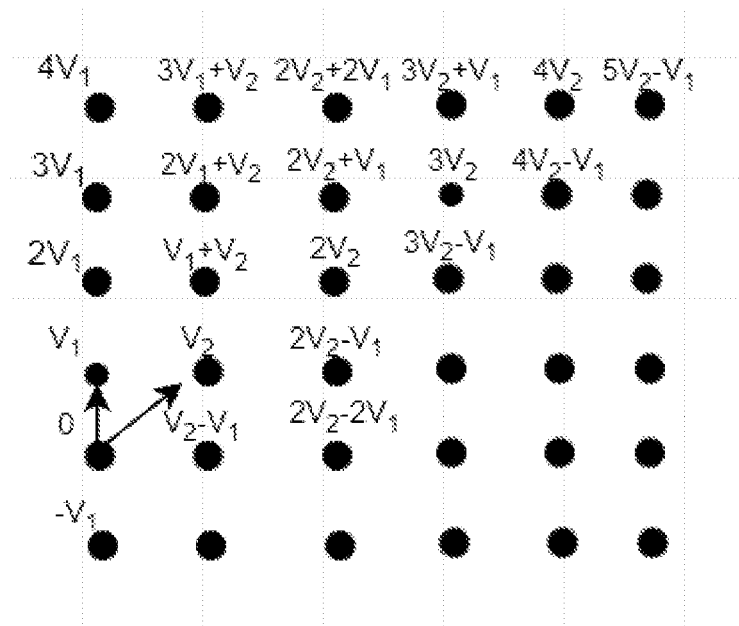
FIG. 1 is a linear combination of basis vectors, according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of elements may be exaggerated for clarity and descriptive purposes. Also, like reference numerals denote like elements.

For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, components, and/or regions, these elements, components, and/or regions should not be limited by these terms. These terms are used to distinguish one element, component, and/or region from another element, component, and/or region. Thus, a first element, component, and/or region discussed below could be termed a second element, component, and/or region without departing from the teachings of the present disclosure.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

The foregoing general description and the following detailed description are exemplary and explanatory and are intended to provide further explanation of the claimed subject matter.

According to exemplary embodiments, an n-dimensional lattice may refer to the set of all integer combinations of n linearly independent vectors $\{b_i, \ldots, b_n\} \in R^n$. The set of vectors $\{b_i, \ldots, b_n\}$ may be referred to as a basis for the lattice. A basis can be represented by the matrix $B=[b_1, \ldots, b_n] \in R^{n*n}$ having the basis vectors as columns. The lattice generated by B is denoted by $\mathcal{L}(B)$. Notice that $\mathcal{L}(B)=\{B_x : x \in Z^n\}$, where B·x is the usual matrix-vector multiplication.

$$\sum_{i=1}^{n} x_i b_i : x_i \in Z, \text{ for } 1 \leq i \leq n$$

According to the exemplary embodiments, the lattice B may be input to a Shortest Vector Problem (SVP) to find a minimum distance of a vector of the lattice B. Table 1 presents the complexities of currently known SVP algorithms.

TABLE 1

Complexity of Currently Known SVP Algorithm

| Algorithm | Time | Memory | SVP | |
|---|---|---|---|---|
| Kannan-Enumeration | $n^{n/(2e)+o(n)}$ | poly(n) | ✓ | Proven |
| Voronoi-cell | $2^{2n}$ | $2^n$ | ✓ | Proven |
| ListSieve-Birthday | $2^{2.465n+o(n)}$ | $21.233n + o(n)$ | ✓ | Proven |
| Gauss Sieve | $2^{0.415n+o(n)}$ | $2^{0.2075n+o(n)}$ | ✓ | Heuristic |
| Nguyen-Vidick sieve | $2^{0.415n+o(n)}$ | $2^{0.2075n+o(n)}$ | ✓ | Heuristic |
| WLTB sieve | $2^{0.3836n+o(n)}$ | $2^{0.2557n+o(n)}$ | ✓ | Heuristic |
| Three-level sieve | $2^{0.3778n+o(n)}$ | $2^{0.2833n+o(n)}$ | ✓ | Heuristic |

According to the exemplary embodiments, an n-tuple $[a_1, \ldots, a_n] \in Z^n$ may be called primitive vector when its coordinates are relatively prime as the n-tuple. For instance, $[6, 10, 15]$ may be a primitive vector in $Z^3$: even though its coordinates are not pairwise relatively prime, they are relatively prime as the 3-tuple.

According to the exemplary embodiments, a vector space V is a set of vectors $v \in V$ which is closed under addition and closed under multiplication by scalars $\alpha \in R$. This means $u+v \in V$ and $\alpha v \in V$, the following axioms must hold $\forall u, v, w \in V$ and all $\alpha, \beta \in R$.

$$u+(v+w)=(u+v)+w$$

$$\exists 0 \in V s \cdot t \cdot 0 + v = v$$

$$\forall v \in V \exists v' \in V s \cdot t \cdot v + v' = 0$$

$$1v=v, \alpha(\beta v)=(\alpha\beta)v, (\alpha+\beta)v=\alpha v+\beta v, \alpha(u+v)=\alpha u+\alpha v$$

Given vectors x and y of length one, which are simply scalars x and y, the most natural notion of distance between x and y is obtained from the absolute value and the distance may be defined as |x−y|. Therefore, distance function for vectors may be defined in a similar manner. A function $\|\ \|$: $R^n \to R$ may be a vector norm if it has the following properties:

$$\|x\| \geq 0 \text{ for any vector } x \in R^n, \text{ and } \|x\|=0 \text{ if and only if } x=0$$

$$\|\alpha x\|=|\alpha|\|x\| \text{ for any vector } x \in R^n \text{ and any scalar } \alpha \in R$$

$$\|x+y\| \leq \|x\|+\|y\| \text{ for any vectors } x, y \in R^n.$$

According to the exemplary embodiments, a octonion may referred to octets (or 8-tuples) of real numbers [20]. Every octonion is a real linear combination of the unit octonions:

$$\{e_0, e_1, e_2, e_3, e_4, e_5, e_6, e_7\}$$

where $e_0$ is the scalar or real element. it may be identified with the real number 1. That is, every octonion x can be written in the following form:

$$x=x_0 e_0+x_1 e_1+x_2 e_2+x_3 e_3+x_4 e_4+x_5 e_5+x_6 e_6+x_7 e_7$$

wherein $x_0, x_1, x_2, x_3, x_4, x_5, x_6$, and $x_7$ may be real coefficients.

According to the exemplary embodiments, the Post-Quantum Cryptographic Communication Protocol comprising the Lattice based RSA algorithm has four subsystems: generation_key, shortest vector generation, encryption, and decryption. The generation_key subsystem uses two distinct prime vectors from 8-dimensional lattice as input and it generates the public and private keys as output.

According to exemplary embodiments, the features, functions, processes, etc., described herein may be implemented via software, hardware (e.g., general processor, CPU, digital signal processing (DSP) chip, an application specific integrated circuit (ASIC), field programmable gate arrays (FPGAs), etc.), firmware, or a combination thereof. In this manner, the Lattice based RSA algorithm and the four subsystems, and/or one or more components thereof may include or otherwise be associated with one or more memories (not shown) including code (e.g., instructions) configured to cause the Lattice based RSA algorithm, and/or one or more components thereof to perform one or more of the features, functions, processes, etc., described herein.

The memories may be any medium that participates in providing code to the one or more software, hardware, and/or firmware components for execution. Such memories may be implemented in any suitable form, including, but not limited to, non-volatile media, volatile media, and transmission media. Non-volatile media include, for example, optical or magnetic disks. Volatile media include dynamic memory. Transmission media include coaxial cables, copper wire and fiber optics. Transmission media can also take the form of acoustic, optical, or electromagnetic waves. Common forms of computer-readable media include, for example, a floppy disk, a flexible disk, hard disk, magnetic tape, any other magnetic medium, a compact disk-read only memory (CD-ROM), a rewriteable compact disk (CDRW), a digital video disk (DVD), a rewriteable DVD (DVD-RW), any other optical medium, punch cards, paper tape, optical mark sheets, any other physical medium with patterns of holes or other optically recognizable indicia, a random-access memory (RAM), a programmable read only memory (PROM), and erasable programmable read only memory (EPROM), a FLASH-EPROM, any other memory chip or cartridge, a carrier wave, or any other medium from which information may be read by, for example, a controller/processor.

According to the exemplary embodiments, the generation_key subsystem is configured to generate new random vectors p and q using Klein's randomized rounding algorithm from 8-dimensional lattice defined on integral octonion. The generation_key subsystem is configured to generate a shortest vector p' by inputting the two random vectors p, q to GS algorithm. The generation_key subsystem is configured to check if p'q sin θ=1 compute n, where n is a n-dimensional vector. Then, the generation_key subsystem is configured to find the Totient function of n. The generation_key subsystem is configured to convert the n-dimensional vector n into a value x by calculating its Euclidean norm $\|n\|$. the Euclidean norm $\|n\|$ can be used to find the vector again as, angles are known. The generation_key subsystem is configured to compute φ(x) to generate x'. The generation_key subsystem is configured to convert x' into $\vec{x}$ by using the same angles as vector $\vec{n}$ has. Using the Klein's randomizing algorithm again, the generation_key subsystem is configured to generate a public key e by calling minPrime function to meet the condition e<phi(x). Thus, for private key the generation_key subsystem may choose d by replacing this mod property $d=e^{-1} \mod \phi(x)$ with condition ed sin θ=1 and ed ⊂ φ(x).

| Algorithm 1 Key Generation |
|---|
| 1: procedure KEYGEN |
| 2:     Input: Lattice basis B = $\{b_1, ..., b_n\}$, $\alpha, \beta > 0 \in \mathbb{R}$ |
| 3:     Output: $K_{pub}, K_{pri}$ |
| 4:     Generate a new vector q using Klein's Alg. |
| 5:     Compute p using Alg. 4 SV_GEN (q) |
| 6:     if p' qsinθ!=1 |
| 7:         Go To step 2. |
| 8:     else |
| 9:         Compute n = p' * q where $n_{ij} \in \mathbb{Z}^{8 \times 8}$ |
| 10:         Compute $x \leftarrow \| n \|$ |
| 11:         Compute $x' \leftarrow \phi(x)$ |
| 12:         Convert x' into $\vec{x}$ |
| 13:         Generate e using Klein's Alg. |
| 14:         then, |
| 15:             Call minPrime function $\| 1 < e < \phi(x)$ |
| 16:             Choose $d \leftarrow edsin\theta = 1 \| ed \subset \phi(x)$ |
| 17:         $K_{pub} \leftarrow (e, n)$ |
| 18:         $K_{pri} \leftarrow (d, n)$ |
| 19: end procedure |

According to the exemplary embodiments, encryption may be performed by taking a message $m \in Z_n$ and multiply it with the octonion: $i=[0,1,0,0,0,0,0,0]_{1*8}$ to obtain the product mi as show in Alg. 2. Select a random isotropic vector $z \in V$, to convert chosen message belonging to Z to an octonion $mi+z \in Z_n^8$. If message length is long, sparse it up and encrypt separately. Let e, d, and n be the vectors points $\in Z_n$ with (e,n) as the encryption key pair and (d,n) as the decryption key pair, n=p'*q. Where, n is public, it will not reveal p and q since the SVP is the basis of security for potentially post-quantum RSA lattice based cryptosystem. We use our sequence of lattice bases to create a challenge, which may be helpful in determining appropriate parameter p' as SVP for the scheme. Hence, to factor n is NP-hard and therefore will assure that d is practically impossible to derive from e. The encryption of the message M may be performed by raising it to the $e^{th}$ power modulo n to obtain C, the cipher text C. The decryption of the cipher text C may be performed by raising it to the $d^{th}$ power modulo n to obtain the message M again.

| Algorithm 2 Ciphertext Generation |
|---|
| 1: procedure: CIPHERTEXT_GEN |
| 2:     Input: $m \in Z_n$ andoctonioni |
| 3:     Output: $C_m \in Z_n^{1*8}$ |
| 4:     where $Z_n$ is set of integers from 0 to n − 1 |
| 5:     Take octonion $i = [0, 1, 0, 0, 0, 0, 0]_{1*8}$ |
| 6:     Compute mi ← m * i |
| 7:     Add $z \in V$ into chosen message mi + z ← mi |
| 8:     mi + $z \in Z_n^8$ and $\{z \in V | a = mi + z\}$ |
| 9:     Call Algorithm 1 to obtain e |
| 10:     Compute $C = a^e \mod n$ |
| 11: end procedure |

| Algorithm 3 Plaintext Generation |
|---|
| 1: procedure: PLAINTEXT_GEN |
| 2:     Input: $C_m \in Z_n^{1*8}$ from Alg.3 |
| 3:     Output: mi $\in Z_n^8$ |
| 4:     Compute $a = C^d \mod n$ |
| 5:     $a = (a^e \mod n)^d \mod n \Longrightarrow (a)^d \mod^2 n$ |
| 6:     a = mi + z |
| 7:     $z \in V \Longrightarrow mi = (mi + z) \mod V$ |
| 8:     mi = (mi + z) modV |
| 9: end procedure |

The Gauss Sieve (GS) algorithm proposed by Micciancio and Voulgaris in 2009 and implemented as gsieve library by Voulgaris may be used to find the shortest vector problem p' by passing it sample vector p and q. The GS algorithm includes a list L of vectors in the lattice and a reduction algorithm that outputs a shorter vector from two input vectors. List L manages the vectors reduced by the reduction algorithm. The number of vectors in L increases but the norm of the vectors in the List L may be reduced by the reduction algorithm, and eventually the shortest nonzero vector can be found in the list L. The GS algorithm runs a subroutine, Gauss Reduce, which is configured to update vector v, the list L, and S. The termination condition of the GS algorithm is determined by the number of collisions of the zero vector ($\|a'\|=0$) that appears in the list L. The variable K in Alg. 4 is the total number of collisions. When the value of K exceeds the threshold condition $\alpha|L|+\beta$, then the GS algorithm may be terminated. In the gsieve library, $$\alpha = \frac{1}{10}$$

and $\beta=200$ are chosen as the threshold values. The theoretical upper bound of the complexity of the GS algorithm is not yet proved; however, in practice, the GS algorithm is is faster than any other sieving algorithms.

The key aspect of using this algorithm is that it does not use perturbation, therefore, its space complexity is reduced, and allowing with lattice points only. It builds a list of shorter and shorter lattice vectors like List Sieve but on addition of a new vector v to the list. The Gauss Sieve reduced the norm of the vector v using the list vectors. Moreover, it also reduced the length of those vectors, using the vector v that is already in the list. Hence, if min $\{\|v \pm u\|\} < \max\{\|v\|, \|u\|\}$ than replace the vector v, u having larger length with shorter v±u. Hence, the list L always contain pairwise reduced vectors. We made few changes in GS, in order to use it with our proposed scheme. In Alg. 1 we added Klein's algorithm step to find new random vector and pass this vector as parameter to Alg. 4. The angle is at least 60 degrees between u and v. Since maximum size of list and space complexity of algorithm is bounded by kissing number. As, in n-dimensions kissing number for n>4 is unknown, but for 8-dimensional vector from highly symmetrical lattices it exits τ8(240).

Alg. 4 is a main algorithm of the Gauss Sieve algorithm, and Alg. 5 and Alg. 6 are subroutines of the Gauss Sieve algorithm, according to the exemplary embodiments.

Alg. 4 is a main algorithm of the Gauss Sieve algorithm, and Alg. 5 and Alg. 6 are its subroutines.

| Algorithm 4 Gauss Sieve |
|---|
| 1: procedure: SV_GEN |
| 2:     Input: Vector v = q from Alg.1 |
| 3:     Output: A shortest vector in $\mathcal{L}$(B) |
| 4:     L ← { }, S ← { }, K ← 0 |
| 5:     while K < $\alpha | L | + \beta$ do |
| 6:         if S ≠ { }then |
| 7:             pop from stack S to v |
| 8:         else |
| 9:             (v', L, S) ←Gauss-Reduce (v, L, S) |
| 10:         if $\| v' \| = 0$ then |
| 11:             K ← K + 1 |
| 12:         else |
| 13:             L ← L ∪ {v'} |
| 14:     return a shortest vector in L. |
| 15: end procedure |

| Algorithm 5 Reduce |
| --- |
| 1: Input: Vectors $p_1$, $p_2$ in Lattice $\mathcal{L}$ (B) |
| 2: Output: Vectors $p_1$ in lattice $\mathcal{L}$(B) s.t. $\left\lvert \frac{(p_1, p_2)}{(p_2, p_2)} \right\rvert \leq \frac{1}{2}$ |
| 3: If $\lvert 2 \cdot (p_1 \cdot p_2) \rvert > (p_2 \cdot p_2)$ then |
| 4: $p_1 \leftarrow p_1 - \left\lfloor \frac{(p_1, p_2)}{(p_2, p_2)} \right\rfloor \cdot p_2$ |
| 5: return $p_1$ |

| Algorithm 6 Gauss Reduce |
| --- |
| 1: procedure: GAUSS_REDUCE |
| 2:    Input: Vector v on $\mathcal{L}$ (B), list L, stack S |
| 3:    Output: Vector v, list L, stack S, s.t. v ∪ L is pairwise reduced |
| 4:    reduce_flag ← true |
| 5:    while reduce_flag = true do |
| 6:       reduce_flag ← false |
| 7:       for l ∈ L |
| 8:          v' ←Reduce(v,l) |
| 9:          if v' ≠v then |
| 10:             reduce_flag ← true |
| 11:             v ← v' |
| 12:    while l ∈ L do |
| 13:       l' ←Reduce(l,v) |
| 14:       if l' ≠ l then |
| 15:          S ← S ∪ {l'}, L ← L\{l} |
| 16:       return (v, L, S) |
| 17: end procedure |

According to the exemplary embodiments, a Vector Space refers to a collection of vectors, which may be added together or multiplied by some scalars or vector. A vector can be multiplied by another vector to obtain the vector product or cross product.

The vector product C of the two vectors A and B may be referred to $C = A*B = \|A\|*\|B\| \sin \theta$. In other words, the vector product C is a product of magnitude of vectors time the sine of angle between them.

Similarly, a scalar product is another way to multiply two vectors. The scalar product is constructed by taking component of one vector in direction of another vector. Therefore, the scalar product C is a scalar product of two vectors of A and B may be referred to $C = A \cdot B = \|A\|*\|B\| \cos \theta$. According to the exemplary embodiments, two prime vectors $V_1$ and $V_2$ may be used to construct the product vector n. Since vectors may be described by the magnitude and direction, each vector has a magnitude and a specific direction. The vectors $V_1$, $V_2$, and n has a magnitude as well as direction. In XY-plane we have a maximum angle of $\theta = 180°$. If $V_1$ has angle $\theta_1$ and the maximum angle is $\theta$ then the $V_2$ has angle $\theta_2$ and it can be calculate as follows:

Max angle=θ

Angle of $V_1$=$\theta_1$

Angle of $V_2$=$\theta_2$

As θ=$\theta_1$+$\theta_2$ $\theta_2$=θ−$\theta_1$

The product of two vectors may be either a scalar or a vector. If we calculate the normed vector, we get a scalar value. The norm value of the vector may be used in finding the public and private key. The calculated norm value of the vector can be used again to find the actual vector. Therefore, a single norm value of the vector can be mapped to different values. We can denote the norm value of the vector by $\|u\|$. The norm of a vector for two dimension can be calculated by:

$$\|u\| = \sqrt{u_1^2 + u_2^2}$$

Norm value of the vectors of different vectors may have the same value. As an example, we have two vectors $V_1$ and $V_2$. The components of $V_1$ are $[v_{11}, v_{12}]$ and components of $V_2$ are $[v_{21}, v_{22}]$. The components of vectors may be different, but the norm value of the different vectors $V_1$ and $V_2$ may be substantially the same. Let's suppose $v_{11}=\alpha$, $v_{12}=\beta$, $v_{21}=\alpha'$, and $v_{22}=\beta'$. The first component of $V_1$ may be substantially the same to the second component of $V_2$, which means $v_{11} = v_{22}$ and $v_{12} = v_{21}$.

The normed of $V_1$ may be calculated as follows:

$$V_1 = \sqrt{v_{11}^2 + v_{12}^2}$$
$$= \sqrt{(\alpha^2 + \beta^2)}$$
$$= \sqrt{\gamma^2}$$
$$= \gamma \text{ (where } \alpha^2 + \beta^2 = \gamma^2\text{).}$$

Similarly, the normed of $V_2$ may be calculated as follows:

$$V_2 = \sqrt{v_{21}^2 + v_{22}^2}$$
$$= \sqrt{(\alpha'^2 + \beta'^2)}$$
$$= \sqrt{\gamma^2}$$
$$= \gamma$$

When different vectors lead to substantially the same norm value, we may not calculate the exact components of a vectors. However, according to the exemplary embodiments, we have taken the vectors from a single lattice. Each vector in a lattice have a specific location. So vector $V_1$ and $V_2$ are different. They have assigned a different location in a lattice. The normed of vector is unique for each specific position. Accordingly, for each norm value according to the exemplary embodiments, there is a unique position and from this norm value we can divert to a specific location. In the above two vectors $V_1$ and $V_2$, both have the same norm value. So if we want to find the dimension of the vectors given this norm value, we cannot find the exact vector. Therefore, according to the exemplary embodiment, the concept of vector location may be used.

Given same norm value for different vectors, we may only locate the exact vector on the basis of location of vectors. For any two vectors $V_1$ and $V_2$ having the same norm value γ, the decryption of whole process is only possible when the norm value may be returned to the exact vector. If γ returns to $V_1$ (exact location for γ) γ→$V_1$. then the decryption process may return the exact message. If γ returns to some other vector γ→($V_2$, $V_2$ ... $V_n$), then the decryption process will return some garbled value instead of the exact message.

According to the Exemplary embodiments, given a set of vectors V=$V_1$, $V_2$, $V_3$, ... $V_n$, finding the exact vector in V for the given norm value, is based on number of vectors having the same norm value.

The two vectors $V_1$ and $V_2$ may have the same norm value; $V_1=V_2=\gamma$, where $\gamma$ is the norm value. The probability (Pb) to find the exact norm value for a given vector is: $Pb(V_1)+Pb(V_2)=1$, where 1 is the maximum probability.

The probability of each vector to have the same norm value is equal. Since the maximum probability is 1 and there are only two vectors, the probability of each vector is 0.5.

$$Pb(V_1)=0.5$$

$$Pb(V_2)=0.5$$

In case of two vectors, the probability of each vector for given norm value is half, and we may not locate the exact vector for given norm value. If we have multiple vectors having same norm value, then the probability of each vector is further reduced from half. As a result, for a given norm value, the location of exact vector depends on number of vectors having same norm value.

There are two conditions to check whether an inverse of an operator exists or not.

An operator $\tau: X \to Y$ is called one-to-one mapping of X into Y if and only if $$x_1, x_2 \in X \text{ and } x_1 \neq x_2$$

$$\to \tau(x_1) \neq \tau(x_1)$$

We may determine that the operator $\tau$ is one-to-one if inverse of any point $y \in Y$ is at most a single point of X:

$$|\tau^{-1}\{y\}| \leq 1 \ \forall y \in Y$$

An operator $\tau: X \to Y$ is called on-to mapping if every element of X is mapped to at least one element of y;

$$\tau(X)=Y.$$

If an operator $\tau: X \to Y$ is an one-to-one mapping and an on-to mapping, then an inverse $\tau_{-1}$ exist for the operator $\tau$. Therefore, $\tau(X)y$ if and only if $\tau_{-1}\{y\}=X$.

If a linear operation $A: X \to Y$ (for vectors X and Y) has an inverse, then that inverse $A_{-1}$ is also linear.

$$A^{-1}(y_1)x_1\ A(x_1)=y_1$$

$$A^{-1}(y_2)=x_2\ A(x_2)=y_2$$

Then by linearity of A, we have $A(\alpha x_1+x_2)=(\alpha A\ x_1+A\ x_2)=\alpha y_1+y_2$.

Therefore, $A^{-1}(\alpha A\ x_1+A\ x_2)=\alpha\ x_1+x_2=\alpha A^{-1}y_1+A^{-1}y_2$.

There are public key encryption technique for which no efficient usage of Shor's algorithm is available. The most promising ones are lattice based encryption, code based encryption etc. According to the exemplary embodiments, the cryptographic protocol may use a lattice based encryption scheme. It is one of the candidate that is considered secure against quantum computers. The lattice based encryption scheme according to the exemplary embodiment may provide strong security proof, simplicity, and efficiency.

As in lattice based cryptography one of the presumed NP-hardness of lattice is shortest vector problem. Different algorithms are available to solve this problem. One of the security perspective of our proposed protocol is NP-hardness of SVP. As there is no known polynomial time algorithm that is used to solve the exact SVP within polynomial time.

There is no known a polynomial time algorithm to solve exact SVP, as it is NP-hard problem. An LLL algorithm is the first available algorithm to solve the SVP with running time of $2^{O(n^2)}$. In other words, to solve the exact SVP problem one of the latest algorithm is to Discrete Gaussian sampling that requires $2^n$ time.

Similarly, RSA algorithm is one of the public key encryption scheme and is consider secure against classical computers. It's NP-hardness lies in integer factorization. However, Shor's algorithm can break these cryptographic techniques with in polynomial time. According to the exemplary embodiments, the concept of vector factorization and vector location with in lattices may cure the deficiencies of the conventional encryption scheme since factorizing the vector into two same vectors is one of the difficult problem in lattices as discussed in "Singular Value Decomposition" section.

Vector location is used to solve the problem of vector factorization in lattices. If the same vectors are generated from the resultant vector, then it may lead to a wrong solution, and it may generate a garbled value and decryption to original message is not possible.

FIG. 1 is a linear combination of basis vectors, according to an exemplary embodiment. The lattice of FIG. 1 is linear combination of basis vectors. The span of basis $V_1$ is the set $\{2V_1, 3V_1, \ldots\}$ and span of $V_2$ is the set $\{2V_2, 3V_2, \ldots\}$. The rest of vector is linear combination of the basis vectors. Since all vectors are linear combination of rest of the vectors, the vector formed from any of the given vectors need to be decomposed into the same two vectors. All the basis vectors are mapped to some vector and on the basis of their location, we may complete the decryption process to its original message.

Figure 2:
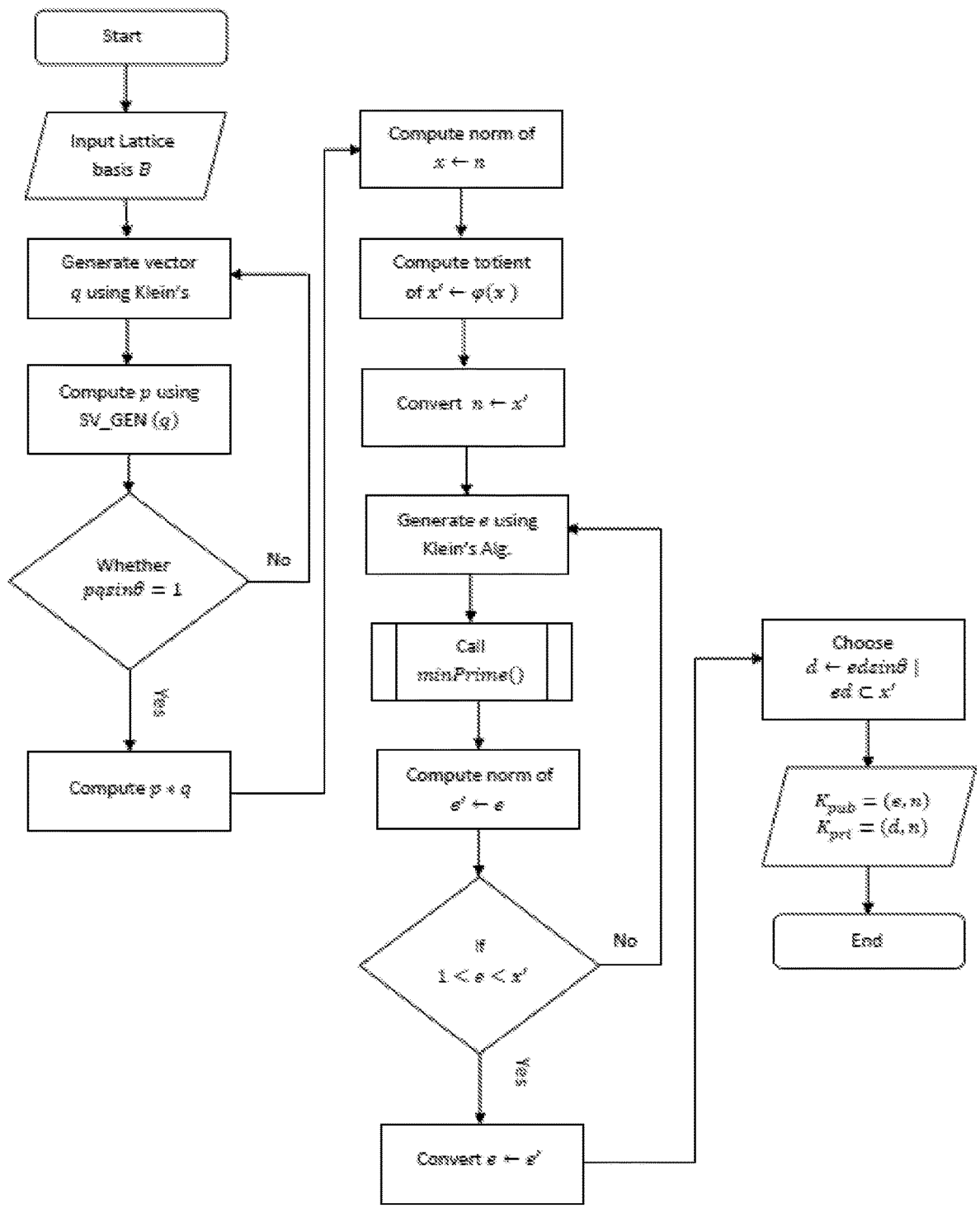
FIG. 2 is a flow chart of lattice-based RSA algorithm, according to an exemplary embodiment.

FIG. 2 is a flow chart of lattice-based RSA algorithm, according to an exemplary embodiment. Referring to FIG. 2, $3V_2$ is the resultant vector of more then one pair of vectors. This vector is in the span of basis vector and may be a linear combination of rest of the vectors. A vector pair $[2V_2, 3V_2-V_1]$ formed the resultant vector $3V_2$, however this resultant vector may also be a linear combination of some other vector pair. If during the encryption process this resultant vector is formed from the vector pair $[2V_2, 3V_2-V_1]$ then it can only be decrypted to the original message if and only if this resultant vector is decomposed into this pair $[2V_2, 3V_2-V_1]$. Decomposition of resultant vector into some other vector pair lead us to some garbled value, and decrypting the encrypted message to original message is not possible.

According to the exemplary embodiments, the encryption scheme provides a lattice based cryptography. As cryptosystems based on lattice problems have received renewed interest, for a few reasons. Exciting new applications (such as fully homomorphic encryption, code obfuscation, and attribute-based encryption) have been made possible using lattice-based cryptography. Most lattice-based key establishment algorithms are relatively simple, efficient, and highly parallelizable. Likewise, the security of some lattice-based systems are provably secure under a worst-case NP-hardness assumption, rather than on the average case. On the other hand, it has been proven difficult to give precise estimates of the security of lattice schemes against even known cryptanalysis techniques.

Quantum computers employ quantum algorithms that can solve certain classes of problems including integer factorization and discrete logarithms quickly that's enough to jeopardize the security of the encrypted information. So, security of RSA algorithm is our ultimate concern. The RSA public-key cryptosystem started as nothing more than a trapdoor one-way function, "cube modulo n". Moreover, integer based RSA algorithm is also not secure in the sense of indistinguishability of encryption.

According to the exemplary embodiments, the new concept of RSA algorithm is now based on lattices rather than integer factorization problem. Since, in lattice-based cryptography all key selection is not just strong but also hard to solve, its security is similar to getting lost in a 400 dimensional lattice. The private key for these schemes is a lattice point while the public key is an arbitrary location in space, which can possibly be a nearest point. The linear combination of set of vectors i.e. arrows pointing in different directions could be combined to form lattice points.

The lattice based RSA algorithm according to the exemplary embodiments may use the shortest vector problem as security assumption. The NP-hardness of proposed scheme lies in the NP-hardness of factoring out the product vector obtained from cross product of two prime vectors p and q from 8-dimensional lattice to get a vector n, where p is the shortest vector returned by Gauss Sieve algorithm. We calculate the normed of the vector n, to get a scalar value. This value is used in finding the public and private key. Hence, no polynomial time algorithms exist for solving this problem.

The lattice based RSA algorithm scheme according to the exemplary embodiments may modify the conventional integer-based RSA algorithm to a lattice-based RSA algorithm, thus helping in coping with the future standards of quantum computing. "Lattice-based RSA" public-key cryptosystem could be considered as a strong encryption algorithm replacement of Integer-based RSA algorithm. The security of the lattice based RSA algorithm scheme according to the exemplary embodiment is based on three factors vector factorization, vector mapping and finding shortest vector within 8-dimensional lattice. SVP is NP-hard and unlike the integer factorization nor the (discrete log problem) DLP; there is no known quantum algorithm to solve SVP with the help of a quantum computer. Moreover, the inherent security issues of the conventional integer-based RSA algorithm such as timing attacks and problems with key distribution, may also be addressed by the Lattice-based RSA algorithm. The lattice based RSA encryption scheme according to the exemplary embodiments may provide improved security over the conventional Integer-based RSA algorithm in both performance and security.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A Post-Quantum Computing Cryptographic communication protocol comprising a lattice based RSA algorithm, the protocol comprising:
   generating a public key and a private key pair;
   encrypting a message using a public key pair;
   transmitting the encrypted message over a communication channel; and
   decrypting the encrypted message using a private key pair,
   wherein the generating the public key and the private key pair comprises;
      selecting a first random vector from lattices using a Klein's Algorithm;
      selecting a second random vector from lattices using the Klein's Algorithm;
      generating a shortest random vector using a Gauss Sieve algorithm;
      taking a first vector product of the first random vector and the second random vector;
      calculating a Totient function of the first vector product;
      converting the Totient function to the first vector product;
      generating the public key pair; and
      generating the private key pair.

2. The protocol of claim 1 wherein, the encrypting the message using the public key pair comprises:
   generating a second product vector by multiplying the message with an octonion, the octonion comprising a real linear combination of unit octonions;
   adding the second product vector with an isotropic vector selected from a vector space; and
   generating a cipher text by encrypting the message using the following formula:

$C = a^e \mod n,$ where C is the cipher text, a is addition of the second product vector and the isotropic vector, e is the public key used for encryption, and mod n is a modulo of the first vector product.

3. The protocol of claim 2, wherein the decrypting the encrypted message using a private key pair comprises:
   decrypting the encrypted message using following formula:

$a = C^d \mod V,$ where d is the public key used for decryption and mod V is a modulo of the vector space.

4. The protocol of claim 1 wherein the lattices are 8 dimensional lattices.

5. The protocol of claim 1 wherein, the first random vector, the second random vector, and the shortest random vector are generated and passed to the Gauss Sieve algorithm.

6. The protocol of claim 1 wherein the Totient function of the first vector product is calculated by taking a norm of the first vector product.

7. The protocol of claim 1 wherein, the public key pair is generated by Klein's Algorithm.

8. The protocol of claim 1, wherein the encrypting the message using the public key pair comprises transforming the message into a cipher text.

9. The protocol of claim 8, wherein the decrypting the encrypted message using a private key pair comprises transforming the cipher text into the message.

10. The protocol of claim 1, wherein the protocol configured to be used in a quantum computing environment.

11. A quantum computer programmed with processor-executable instructions to perform operations to implement a Post-Quantum Computing Cryptographic communication protocol comprising a lattice based RSA algorithm, the operations comprising:
   generating a public key and a private key pair;
   encrypting a message using a public key pair;
   transmitting the encrypted message over a communication channel; and
   decrypting the encrypted message using a private key pair,
   wherein the generating the public key and the private key pair comprises;
      selecting a first random vector from lattices using a Klein's Algorithm;
      selecting a second random vector from lattices using the Klein's Algorithm;
      generating a shortest random vector using a Gauss Sieve algorithm;
      taking a first vector product of the first random vector and the second random vector;

calculating a Totient function of the first vector product;
converting the Totient function to the first vector product;
generating the public key pair; and
generating the private key pair.

12. The quantum computer of claim 11 wherein the operation encrypting the message using the public key pair comprises:
generating a second product vector by multiplying the message with an octonion, the octonion comprising a real linear combination of unit octonions;
adding the second product vector with an isotropic vector selected from a vector space; and
generating a cipher text by encrypting the message using the following formula:

$$C = a^e \bmod n,$$

where C is the cipher text, a is addition of the second product vector and the isotropic vector, e is the public key used for encryption, and mod n is a modulo of the first vector product.

13. The quantum computer of claim 12, wherein operation decrypting the encrypted message using a private key pair comprises: decrypting the encrypted message using following formula:

$$a = C^d \bmod V,$$

where d is the public key used for decryption and mod V is a modulo of the vector space.

14. The quantum computer of claim 11 wherein the lattices are 8 dimensional lattices.

15. The quantum computer of claim 11 wherein the first random vector, the second random vector, and the shortest random vector are generated and passed to the Gauss Sieve algorithm.

16. The quantum computer of claim 11 wherein the Totient function of the first vector product is calculated by taking a norm of the first vector product.

17. The quantum computer of claim 11 wherein the public key pair is generated by Klein's Algorithm.

18. The quantum computer of claim 11, wherein the operation encrypting the message using the public key pair comprises transforming the message into a cipher text.

19. The quantum computer of claim 18, wherein the operation decrypting the encrypted message using a private key pair comprises transforming the cipher text into the message.

* * * * *